(12) United States Patent
Mayefske et al.

(10) Patent No.: US 10,696,260 B2
(45) Date of Patent: Jun. 30, 2020

(54) MULTIPLE PIVOT ROLLOVER PROTECTION STRUCTURE

(71) Applicant: Deere & Company, Moline, IL (US)

(72) Inventors: Mark J. Mayefske, Sun Prairie, WI (US); Kyle T. Ressler, West Bend, WI (US); Matthew E. Herzmann, Mayville, WI (US); Dan Knight, Murfreesboro, TN (US)

(73) Assignee: DEERE & COMPANY, Moline, IL (US)

( * ) Notice: Subject to any disclaimer, the term of this patent is extended or adjusted under 35 U.S.C. 154(b) by 76 days.

(21) Appl. No.: 15/797,427

(22) Filed: Oct. 30, 2017

(65) Prior Publication Data

US 2019/0126876 A1 May 2, 2019

(51) Int. Cl.
  *B60R 21/13* (2006.01)
  *B60R 21/00* (2006.01)
  *B62D 1/12* (2006.01)

(52) U.S. Cl.
  CPC .... *B60R 21/131* (2013.01); *B60R 2021/0018* (2013.01); *B60R 2021/0081* (2013.01); *B62D 1/12* (2013.01)

(58) Field of Classification Search
  CPC ............... B60R 21/013; B60R 21/131; B60R 2021/00187
  See application file for complete search history.

(56) References Cited

U.S. PATENT DOCUMENTS

| | | | |
|---|---|---|---|
| 3,259,211 A | 7/1966 | Ryskamp | |
| 3,402,941 A * | 9/1968 | Martinmaas | B60R 21/131 280/748 |
| 3,584,897 A | 6/1971 | Frantz et al. | |

(Continued)

FOREIGN PATENT DOCUMENTS

| | | |
|---|---|---|
| DE | 25 43 077 | 3/1977 |
| EP | 1870298 A2 | 12/2007 |

OTHER PUBLICATIONS

Z Master® Professional 3000 Series Riding Mower with 60in Turbo Force® Side Discharge Mower (Model No. 74950 Serial No. 316000001 and Up) Toro—Operator's Manual [online]. [retrieved Oct. 3, 2017]. Retrieved from the Internet: www.toro.com/getpub/97762.

(Continued)

*Primary Examiner* — Faye M Fleming

(57) ABSTRACT

A multiple pivot rollover protection structure includes a pair of primary pivot assemblies and a pair of shipping pivot assemblies. The primary pivot assemblies provide a plurality of different operating positions for the upper ROPS legs, and a generally vertical shipping configuration for the upper ROPS legs extending downwardly alongside and not behind a rear mounted engine. The shipping pivot assemblies provide a generally vertical operating position for each of the intermediate ROPS legs and a generally horizontal shipping configuration for each of the intermediate ROPS legs extending rearwardly alongside and not behind the rear mounted engine. A spring loaded plunger is engageable between each upper ROPS leg and intermediate ROPS leg. A latch may be provided between each of the upper ROPS legs and the intermediate ROPS legs to hold the spring loaded plunger in a disengaged position.

12 Claims, 6 Drawing Sheets

(56) References Cited

U.S. PATENT DOCUMENTS

| | | |
|---|---|---|
| 4,158,460 A | 6/1979 | White |
| 4,202,565 A | 5/1980 | Mosch |
| 4,666,183 A | 5/1987 | Azzarello |
| 4,877,265 A | 10/1989 | DeBraal et al. |
| 4,949,991 A | 8/1990 | Ludwig |
| 5,042,835 A | 8/1991 | Burns |
| 5,129,676 A * | 7/1992 | Sheehan ............... B60R 21/131 280/756 |
| 5,503,430 A * | 4/1996 | Miki ..................... B60R 21/131 280/756 |
| 5,779,272 A | 7/1998 | Panek et al. |
| 5,788,452 A | 8/1998 | Brouwer et al. |
| 5,839,758 A | 11/1998 | Finch et al. |
| 7,387,313 B2 | 6/2008 | Beki |
| 7,396,047 B1 | 7/2008 | Young |
| 7,438,319 B2 | 10/2008 | Cooper et al. |
| 7,568,732 B2 | 8/2009 | Schlup, Jr. |
| 7,641,234 B1 | 1/2010 | Pelnar |
| 7,661,709 B2 | 2/2010 | Becker |
| 7,677,599 B2 | 3/2010 | Kürten et al. |
| 7,922,201 B2 | 4/2011 | Kürten et al. |
| 7,971,904 B2 * | 7/2011 | David ..................... B60R 21/13 280/756 |
| 7,971,905 B2 | 7/2011 | McCord et al. |
| 8,016,320 B2 | 9/2011 | Becker |
| 8,029,019 B2 | 10/2011 | Schmidt et al. |
| 8,403,363 B2 | 3/2013 | Duenchel et al. |
| 8,419,061 B2 | 4/2013 | Fukunaga et al. |
| 8,424,911 B2 | 4/2013 | Alexander, IV |
| 8,523,225 B2 * | 9/2013 | Reinke ................... B60R 21/13 280/756 |
| 8,528,924 B1 | 9/2013 | Bartel et al. |
| 8,777,263 B2 * | 7/2014 | Biers, Sr. ................ B60J 11/00 280/756 |
| 8,905,434 B1 * | 12/2014 | Bartel ................... B60R 21/131 280/756 |
| 9,125,340 B2 | 9/2015 | Tsuchihashi et al. |
| 9,327,670 B1 | 5/2016 | Bartel et al. |
| 9,511,735 B2 * | 12/2016 | Schlup, Jr. ............ B60R 21/131 |
| 9,616,837 B1 * | 4/2017 | Bartel ................... B60R 21/131 |
| 9,676,358 B2 | 6/2017 | Schlup, Jr. |
| 2016/0057924 A1 * | 3/2016 | Asahara ................... B60K 1/00 180/6.5 |
| 2018/0037183 A1 * | 2/2018 | Bartel ..................... B60R 22/48 |

OTHER PUBLICATIONS

European Search Report issued in counterpart application No. 18202780.5 dated Apr. 8, 2019. (8 pages).

* cited by examiner

US 10,696,260 B2

MULTIPLE PIVOT ROLLOVER PROTECTION STRUCTURE

FIELD OF THE INVENTION

The present invention relates to rollover protection structure on zero turning radius (ZTR) mowers.

BACKGROUND OF THE INVENTION

For safety reasons, zero turning radius (ZTR) mowers of a certain weight may be provided with some form of rollover protection structure, or ROPS, to prevent the vehicle from crushing the operator if it accidentally rolls over. The ROPS should be capable of supporting the forces generated by the weight of the vehicle in the event of a rollover, maintaining free space for the operator to reduce the danger of injury.

The ROPS may be steel tubing with a generally rectangular cross section, having lower legs that may be welded to brackets and/or bolted to the vehicle frame. A ROPS is designed to absorb energy from the weight of the vehicle, and the brackets or lower section of the ROPS may transfer energy to the vehicle frame. The ROPS also may include an upper portion or crossbar with an inverted U-shape located above the head of the operator.

Some ROPS may have a single pivot and may be folded down from a raised or upright position to a lowered or folded down position. For example, U.S. Pat. Nos. 4,949,991; 5,503,430; 5,779,272; and 5,839,758 relate to ROPS that can be moved from a raised or upright position to a lowered or folded down position. The hinge assembly where the ROPS structure folds may be a rotary style joint that may be easily and quickly operated between the raised and lowered positions without tools. Retention or locking pins (e.g., rods, clips or bolts) may be inserted through holes or slots in the upper and lower ROPS, and/or through holes in hinge plates joining the upper and lower ROPS.

Some zero turning radius (ZTR) mowers have a single pivot ROPS in which the upper portion may be pivoted rearwardly and downwardly behind the rear mounted engine. Pivoting the upper portion of the ROPS to the lowered position behind the engine may reduce the height of the ZTR mower but increase its length, requiring a longer shipping container or crate, and requiring additional length for storage or transportation of the ZTR mower on a truck or trailer. If part of the ROPS extends out of the container, there also may be a risk of shipping damage. Some ZTR mowers have a single pivot ROPS in which the upper portion may be pivoted forwardly to a lowered position in front of the operator station. For example, U.S. Pat. Nos. 9,511,735 and 9,616,837 show ROPS that can fold forward for shipping. In the lowered position, the upper portion of the ROPS may rest on or above the operator seat. There is a need for a ROPS that may be pivoted further below the operator seat, so the ZTR mower may fit in even smaller shipping containers or crates, and achieve higher shipping density.

Conventional folding ROPS on ZTR mowers may be secured in either of the raised or lowered positions by inserting one or more locking pins through holes in the upper ROPS tubing walls and hinge plates respectively to secure the upper portion. The pins may be rods, clips or bolts. Some ROPS on ZTR mowers have spring loaded knobs which must be pulled out and rotated 90 degrees to engage or disengage the pins from the holes. A ZTR mower with a folding ROPS is needed that is relatively simple to operate and helps reduce or minimize use of the ZTR mower while the ROPS is not secured in an operating position.

SUMMARY OF THE INVENTION

A multiple pivot rollover protection structure provides a shipping configuration in which the intermediate ROPS legs that extend horizontally rearwardly from the lower ROPS legs, and the upper ROPS legs extend vertically downwardly from the pair of intermediate ROPS legs. The intermediate ROPS legs and upper ROPS legs may be pivoted up from the shipping configuration and secured at a plurality of different operating positions. A spring biased plunger may be used to engage and secure the upper ROPS legs at each of the plurality of different operating positions. An indicator that provides a visible indication if the spring biased plunger is not engaged at one of the plurality of different operating positions

DESCRIPTION OF THE PREFERRED EMBODIMENT

Figure 1:
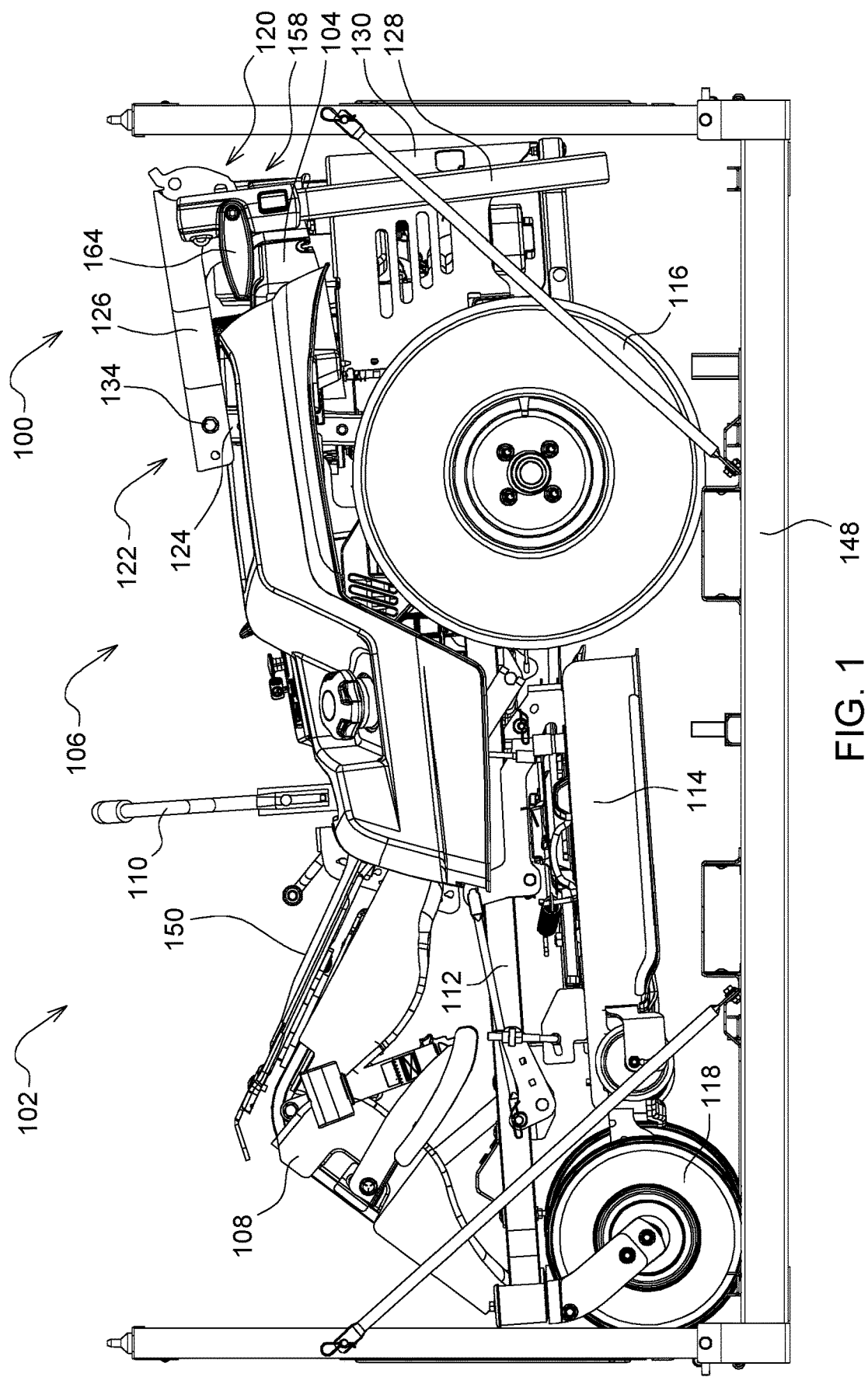
FIG. 1 is a side view of a ZTR mower with a multiple pivot ROPS in the shipping configuration according to one embodiment of the invention.
Figure 2:
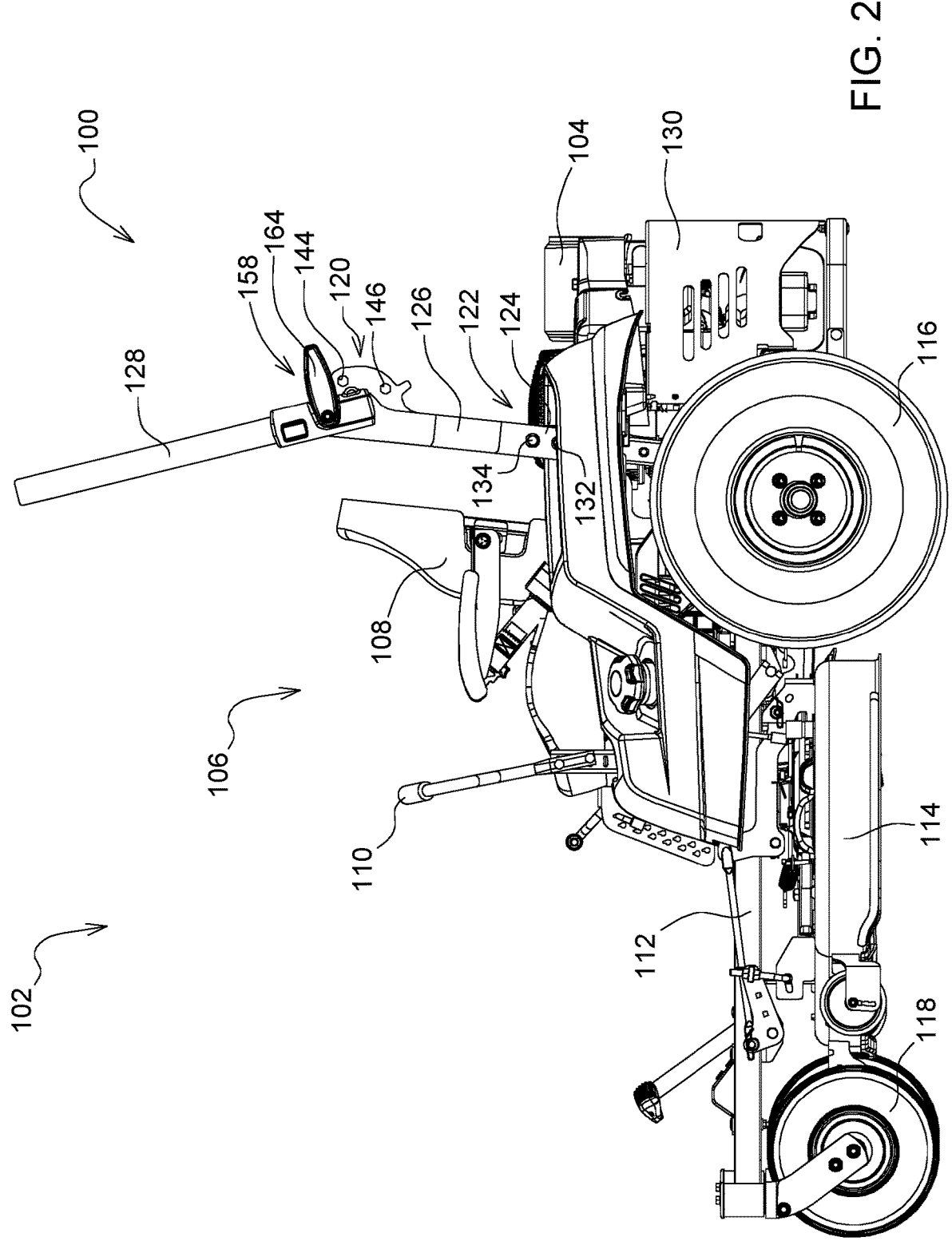
FIG. 2 is a side view of a ZTR mower with a multiple pivot ROPS in the fully raised position according to one embodiment of the invention.
Figure 3:
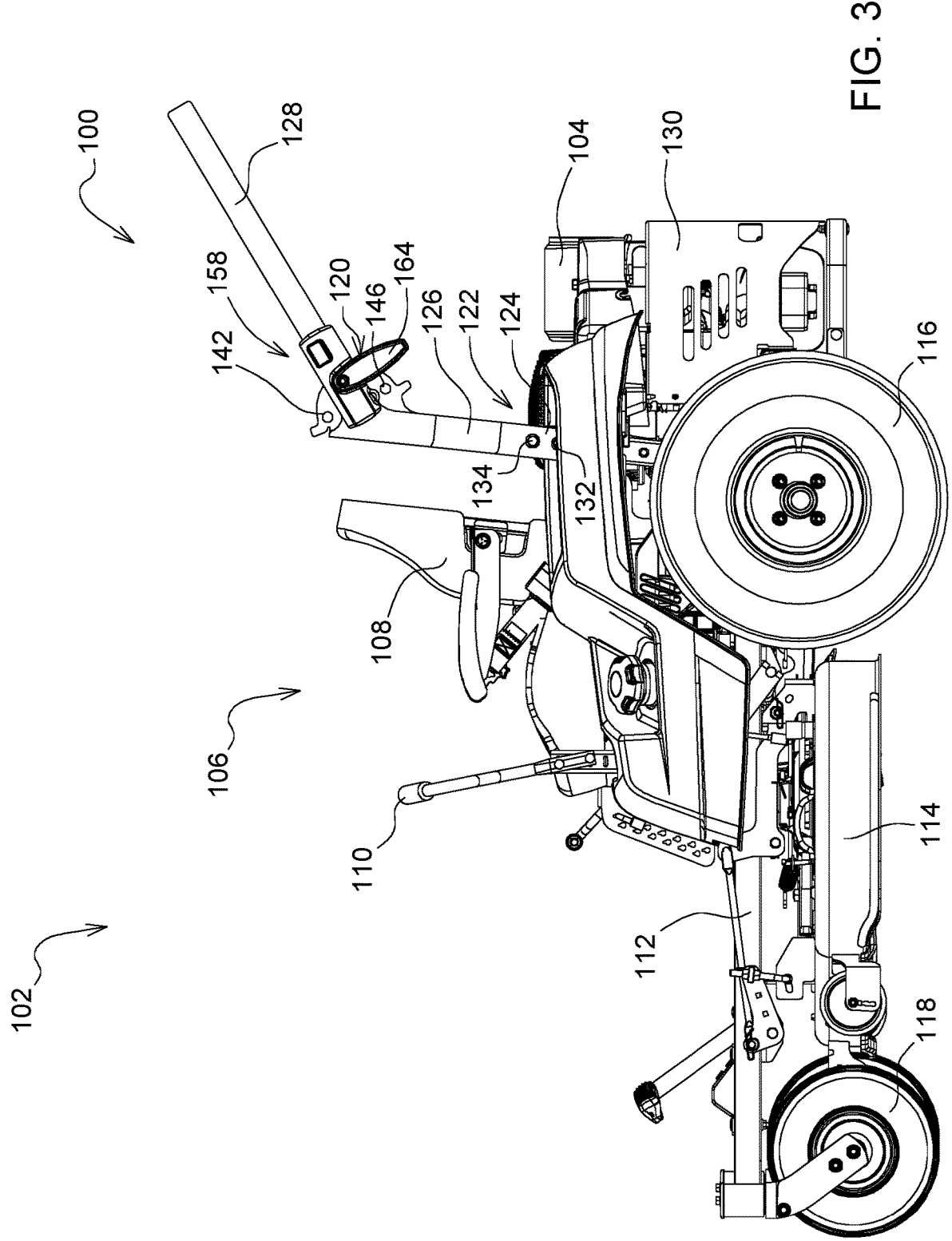
FIG. 3 is a side view of a ZTR mower with a multiple pivot ROPS in the partially raised position for material collection according to one embodiment of the invention.

In a first embodiment shown in FIGS. 1-3, multiple pivot ROPS 100 may be provided on ZTR mower 102 having rear mounted engine 104, operator station 106 with seat 108 in front of the engine, a pair of steering control levers 110 in front of the operator seat, and frame 112 supporting mowing deck 114. Each steering control lever 110 may be pivoted to control one of rear drive wheels 116 through a hydrostatic transmission, and the front of the frame may be supported by a pair of pivotable front wheels 118.

In one embodiment, multiple pivot ROPS 100 may be attached to frame 112 of ZTR mower 102. The multiple pivot ROPS may be tubular steel with a generally rectangular cross section bent into a desired shape. The multiple pivot ROPS may be mounted to the frame on each side of operator station 106 behind seat 108, and adjacent or in front of rear mounted engine 104. The multiple pivot ROPS may include a pair of primary pivot assemblies 120 that may be used by the operator to pivot the ROPS between a plurality of different operating positions. The multiple pivot ROPS also may include a pair of shipping pivot assemblies 122 that may be used, along with the primary pivot assemblies, to pivot the ROPS between an operating configuration and a shipping configuration.

In one embodiment, multiple pivot ROPS 100 may include a pair of lower ROPS legs 124 mounted or fastened using threaded fasteners or welded to support brackets on frame 112. The pair of lower ROPS legs may be pivotably connected with a pair of shipping pivot assemblies 122 to a pair of intermediate ROPS legs 126. The pair of intermediate ROPS legs may be pivotably connected with a pair of primary pivot assemblies 120 to a pair of upper ROPS legs 128. The upper ROPS legs may be connected together to form an inverted U-shape.

In one embodiment, multiple pivot ROPS 100 may include a pair of shipping pivot assemblies 122 that may be used to pivot the pair of intermediate ROPS legs 126 rearwardly to extend behind the pair of lower ROPS legs 110. In the shipping configuration, as shown in FIG. 1, the intermediate ROPS legs may be horizontally oriented (or less than about 10 degrees from horizontal) along each side of rear mounted engine 104. The multiple pivot ROPS also may include a pair of primary pivot assemblies 120 that may be used to pivot the pair of upper ROPS legs 128 downwardly to extend below the pair of intermediate ROPS legs 126. In the shipping configuration shown in FIG. 1, upper ROPS legs 128 may be vertically oriented (or less than about 10 degrees from vertical) along each side of the engine. In the shipping configuration, no part of the multiple pivot ROPS may extend rearwardly behind engine 104 or the engine's protective shield 130.

In one embodiment, multiple pivot ROPS 100 may include a pair of shipping pivot assemblies 122, each assembly having first and second threaded fasteners 132, 134. In any of the operating configurations, as shown in FIGS. 2 and 3, the first and second threaded fasteners may be inserted through a pair of holes in lower ROPS leg 124 and a corresponding pair of holes in intermediate ROPS leg 126. In the shipping configuration, as shown in FIG. 1, the first or lower threaded fasteners 132 may be removed from the holes, and the second or upper threaded fasteners 134 may be loosened so that the intermediate ROPS legs may be pivoted rearwardly on the axes of the second or upper threaded fasteners 134 to a horizontal position (or less than about 10 degrees from horizontal) along each side of engine 104.

In one embodiment, multiple pivot ROPS 100 may include a pair of primary pivot assemblies 120, each assembly having a first plate 136 on the upper end of intermediate ROPS leg 126 with a plurality of holes 142, 144, 146 to secure an upper ROPS leg at one of the available operating positions. For example, the available operating positions may include a fully raised or deployed position as shown in FIG. 2, an intermediate position for bagging grass with a material collection system as shown in FIG. 3, and a lowered or stowed position behind the rear mounted engine. Each primary pivot assembly 120 also may include a second plate 138 on the upper end of the intermediate ROPS leg which may be parallel and spaced from the first plate, and a pivot rod 140 which may extend through holes 137, 139 in the first and second plates, and hole 141 in upper ROPS leg 128. Pivot rod 140 provides the pivot axis between the upper ROPS leg and intermediate ROPS leg 126.

Additionally, each primary pivot assembly may include dampener 178 attached to rod 180 on the upper ROPS leg. Dampener 178 may abut stop 182 on the lower ROPS leg and may prevent the upper ROPS leg from pivoting forward from the fully raised or deployed position.

In one embodiment, multiple pivot ROPS 100 may be moved from the shipping configuration of FIG. 1, to an operating configuration as shown in FIG. 2 or 3, by pivoting the pair of intermediate ROPS legs 126 from their horizontal position to a vertical or nearly vertical position, and then securing and tightening the first and second threaded fasteners extending through the holes in each lower ROPS leg 124 and intermediate ROPS leg 126. Additionally, to move upper ROPS legs 128 from the shipping configuration of FIG. 1 to the fully raised operating configuration of FIG. 2, the upper ROPS legs may be pivoted approximately 180 degrees from their vertical position extending down beside the engine to a vertical position extending up from intermediate ROPS legs 126.

In one embodiment, multiple pivot ROPS 100 may provide a shipping configuration for a ZTR mower 102 in which the ZTR mower may have a height of about 1 m or less and a length of about 2 m or less to fit inside a shipping container or crate 148. As shown in FIG. 1, the shipping configuration may include pivoting the operator seat 108 forward in front of operator station 106, over and adjacent front wheels 118. The operator seat may have a pivoting support or hinge between the front end of seat pan 150 and the frame of the ZTR mower. Steering control levers 110 also may be pivoted forwardly in the shipping configuration.

Figure 5:
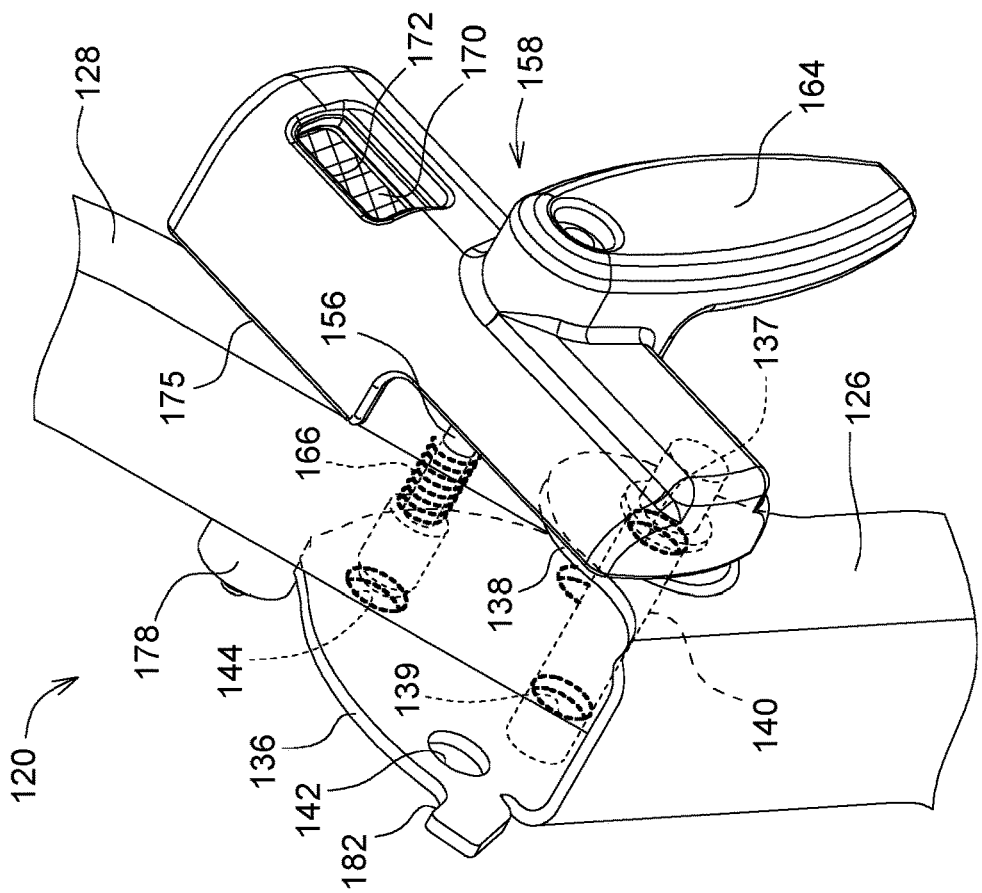
FIG. 5 is a perspective view of a primary pivot assembly of a multiple pivot ROPS in a disengaged position according to one embodiment of the invention.
Figure 4:
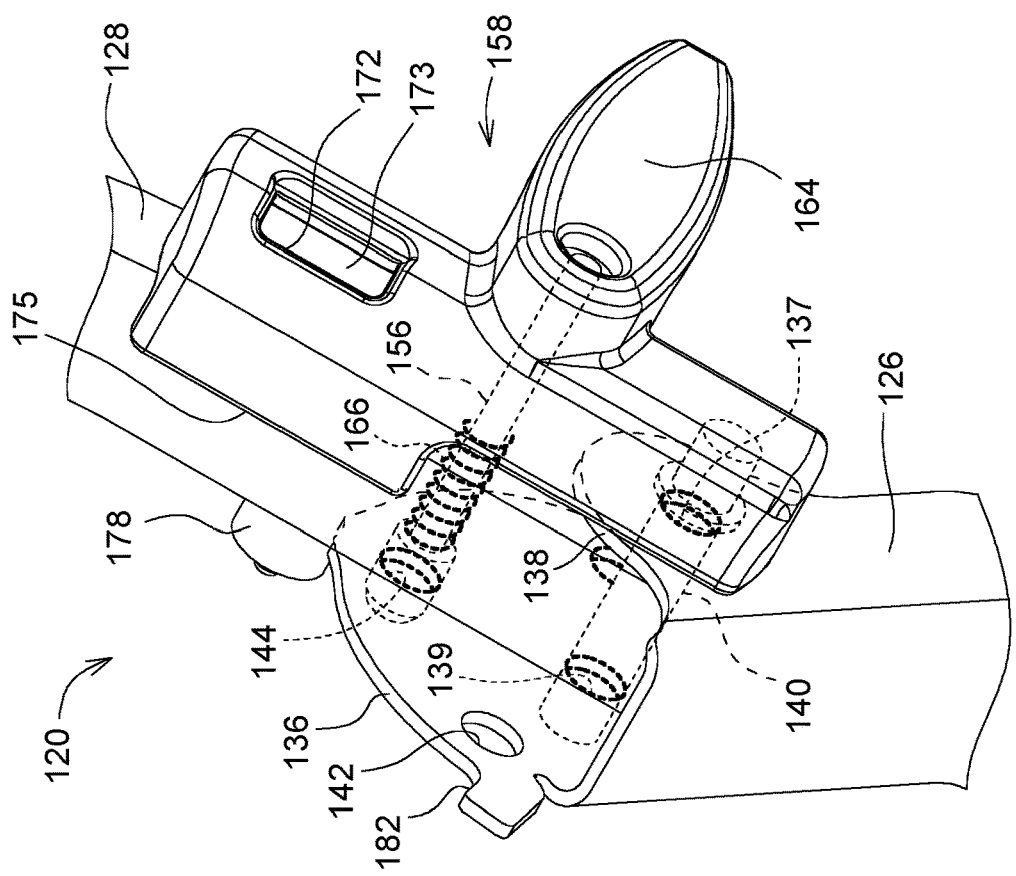
FIG. 4 is a perspective view of a primary pivot assembly of a multiple pivot ROPS in an engaged position according to one embodiment of the invention.
Figure 6:
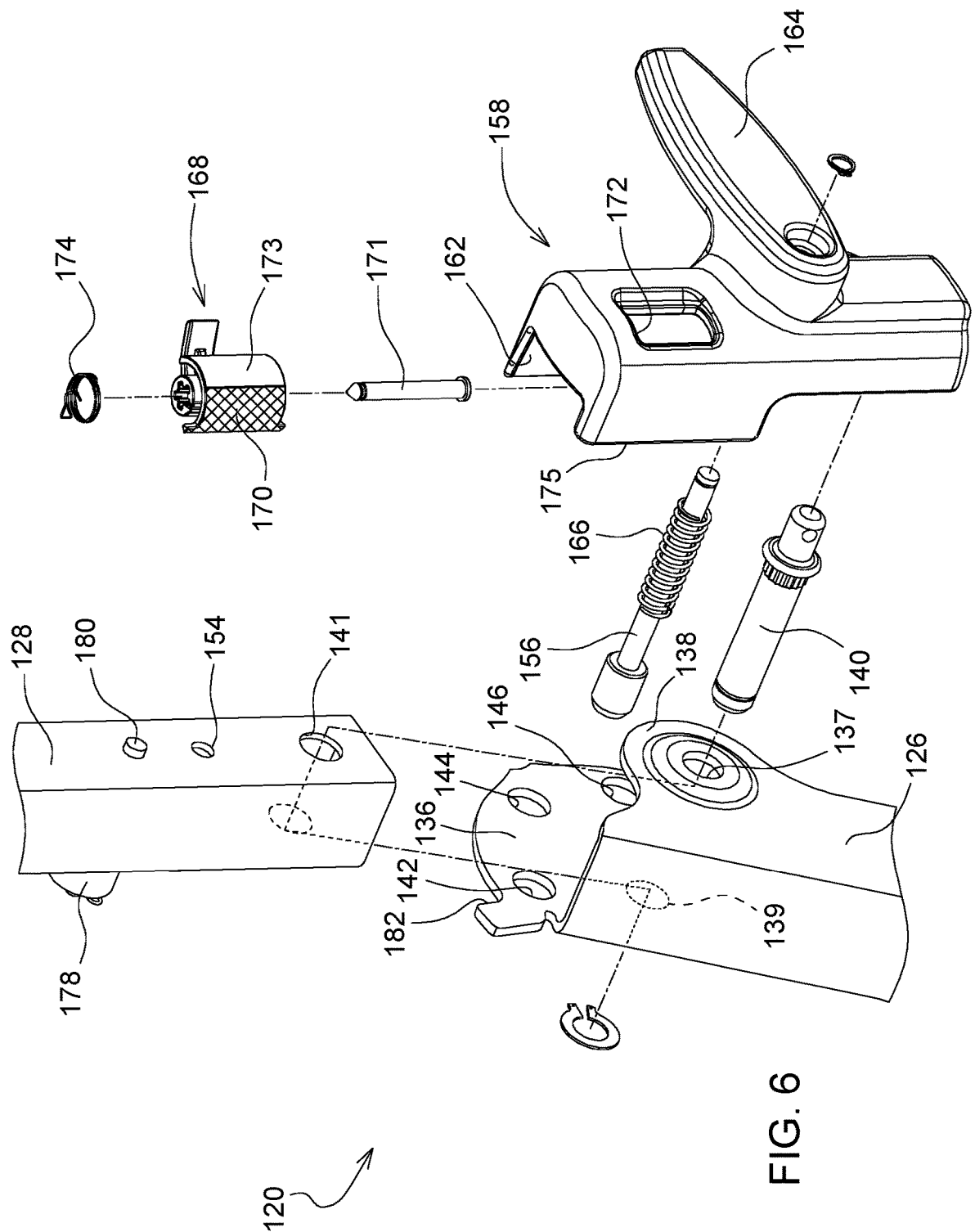
FIG. 6 is a partially exploded perspective view of a primary pivot assembly of a multiple pivot ROPS according to one embodiment of the invention.

In one embodiment, as shown in FIGS. 4-6, the multiple pivot ROPS may include a pair of primary pivot assemblies 120, each primary pivot assembly including plunger 156 that the operator may use to engage upper ROPS leg 128 at any of a plurality of available operating positions. Spring 166 may be provided around plunger 156 to urge the plunger into engagement with any of holes 142, 144, 146 in plate 136. Each primary pivot assembly also may include latch 158. Latch 158 may include handle 164 that an operator may use to move plunger 156 into engagement or out of engagement. Latch 158 may be pivotably mounted on pivot rod 140 to intermediate ROPS leg 126. Pivot rod 140 allows latch 158 to pivot in alignment with upper ROPS leg 128 to each of the available operating positions. For example, FIG. 4 shows latch 158 pivoted in alignment with upper ROPS leg 128 to an intermediate operating position where plunger 156 engages hole 144. With plunger 156 engaged, upper ROPS leg 128 is captured in channel 162 in latch 158. FIG. 5 shows latch 158 once the operator has turned handle 164 counterclockwise to a latched position, about 30 degrees out of alignment with upper ROPS leg 128. In the latched position, step 175 on latch 158 abuts the surface of upper ROPS leg 128, holding plunger 156 from engaging any of the holes. The operator may turn handle 164 clockwise back about 30 degrees to move latch 158 off step 175 and back into alignment with upper ROPS leg 128, so that plunger 156 may engage one of the holes in the first plate.

In the embodiment of FIGS. 4-6, multiple pivot ROPS 100 also may include a visual indicator 168 that may inform the operator if plunger 156 is not engaged at one of the available operating positions. For example, the visual indicator may be tumbler 168 which may be pivotably mounted on rod 171, providing an indicator 170 to the operator through window 172. Spring 174 may bias tumbler 168 to a position where indicator 170 on a first side of the tumbler faces window 172 if the operator has turned handle 164 to a latched position, with step 175 abutting the surface of upper ROPS leg 128. Indicator 170 may include a bright color, symbol or message on a surface the tumbler and displayed to the operator through the window. When the operator turns handle 164 so that the plunger may be engaged in an operating position, upper ROPS leg 128 may push the tumbler to turn and show the opposite side 173 of the tumbler through the window.

Figure 7:
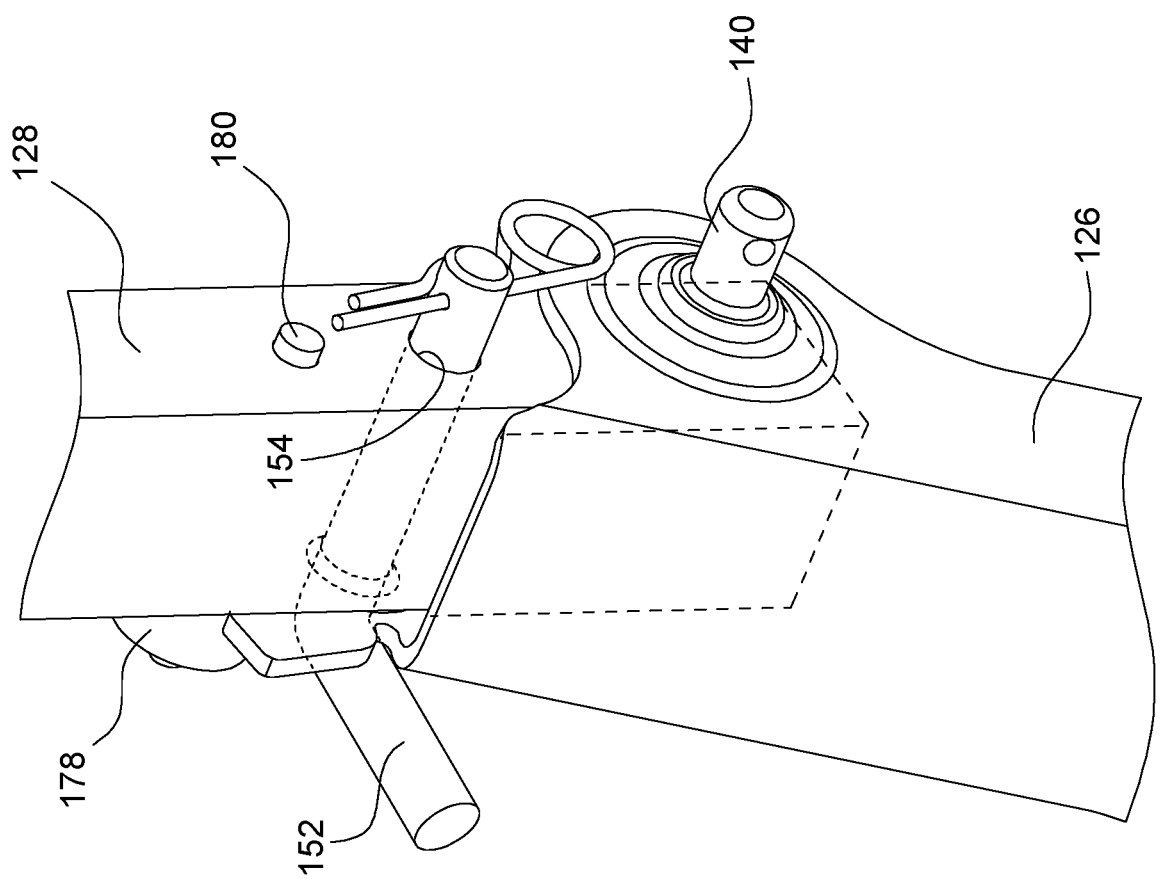
FIG. 7 is a perspective view of a primary pivot assembly of a multiple pivot ROPS in an engaged position according to an alternative embodiment of the invention.

In an alternative embodiment, as shown in FIG. 7, the multiple pivot ROPS may include a pair of primary pivot assemblies, each primary pivot assembly including pin 152 that the operator may use to secure upper ROPS leg 128 at one of the available operating positions. After pivoting the upper ROPS leg 128 to the desired operating position, the operator may insert pin 152 through hole 154 in the upper ROPS leg, and through any of the plurality of holes 142, 144, 146 in first plate 136.

Having described the preferred embodiment, it will become apparent that various modifications can be made without departing from the scope of the invention as defined in the accompanying claims.

We claim:

1. A multiple pivot rollover protection structure, comprising:
   a pair of intermediate ROPS legs that extend horizontally rearwardly from a pair of lower ROPS legs attached to a vehicle frame in a shipping configuration; and
   a pair of upper ROPS legs that extend vertically downwardly from the pair of intermediate ROPS legs in the shipping configuration;
   wherein the pair of intermediate ROPS legs and the pair of upper ROPS legs do not extend behind a rear mounted engine and an engine guard in the shipping configuration.

2. The multiple pivot rollover protection structure of claim 1 wherein the pair of intermediate ROPS legs and the pair of upper ROPS legs may be pivoted up from the shipping configuration and secured at a plurality of different operating positions.

3. A multiple pivot rollover protection structure, comprising:
   a pair of intermediate ROPS legs that extend horizontally rearwardly from a pair of lower ROPS legs attached to a vehicle frame in a shipping configuration; and
   a pair of upper ROPS legs that extend vertically downwardly from the pair of intermediate ROPS legs in the shipping configuration;
   a spring loaded plunger to secure one of the upper ROPS legs at an operating position.

4. The multiple pivot rollover protection structure of claim 3 further comprising an operator seat and a pair of steering controls that are pivoted forwardly in the shipping configuration.

5. A multiple pivot rollover protection structure, comprising:
   a pair of primary pivot assemblies connecting between a pair of intermediate ROPS legs and a pair of upper ROPS legs; each primary pivot assembly providing a plurality of different operating positions for each of the upper ROPS legs, and providing a generally vertical shipping configuration for each of the upper ROPS legs behind the intermediate ROPS legs and extending downwardly alongside and not behind a rear mounted engine; and
   a pair of shipping pivot assemblies connecting between a pair of lower ROPS legs and the pair of intermediate ROPS legs, each shipping pivot assembly providing a generally vertical operating position for each of the intermediate ROPS legs and a generally horizontal shipping configuration for each of the intermediate ROPS legs behind the lower ROPS legs and extending rearwardly alongside and not behind the rear mounted engine.

6. The multiple pivot rollover protection structure of claim 5 further comprising a spring biased plunger in each of the primary pivot assemblies for engaging and securing the upper ROPS legs in each of the plurality of different operating positions.

7. The multiple pivot rollover protection structure of claim 6 further comprising an indicator that provides a visible indication if the spring biased plunger is not engaged at one of the plurality of different operating positions.

8. The multiple pivot rollover protection structure of claim 6 wherein each of the primary pivot assemblies includes a latch pivotably mounted to each of the intermediate ROPS legs for holding the plunger out of engagement.

9. A multiple pivot rollover protection structure, comprising:
   a pair of lower ROPS legs mounted to a pair of frame members on each side of an operator station in front of a rear mounted engine;
   a pair of intermediate ROPS legs pivotably mounted to the pair of lower ROPS legs;
   a pair of upper ROPS legs pivotably mounted to the pair of intermediate ROPS legs;
   the pair of intermediate ROPS legs and the pair of upper ROPS legs pivotable rearwardly and downwardly to a shipping configuration above and alongside but not behind the rear mounted engine.

10. The multiple pivot rollover protection structure of claim 9 further comprising a seat and a pair of steering controls pivotable forwardly to the shipping configuration.

11. The multiple pivot rollover protection structure of claim 9 further comprising a spring loaded plunger engageable between each upper ROPS leg and intermediate ROPS leg.

12. The multiple pivot rollover protection structure of claim 9 further comprising a latch between each of the upper ROPS legs and the intermediate ROPS legs that holds the spring loaded plunger in a disengaged position.

* * * * *